United States Patent

Peter-Hoblyn et al.

[11] Patent Number: 5,342,592
[45] Date of Patent: Aug. 30, 1994

[54] LANCE-TYPE INJECTION APPARATUS FOR INTRODUCING CHEMICAL AGENTS INTO FLUE GASES

[75] Inventors: Jeremy D. Peter-Hoblyn, Cornwall; Francois X. Grimard, London, both of Great Britain

[73] Assignee: Fuel Tech Europe Ltd., London, United Kingdom

[21] Appl. No.: 659,324

[22] PCT Filed: Jul. 4, 1989

[86] PCT. No.: PCT/EP89/00765

§ 371 Date: Apr. 24, 1991

§ 102(e) Date: Apr. 24, 1991

[87] PCT Pub. No.: WO91/00134

PCT Pub. Date: Jan. 10, 1991

[51] Int. Cl.⁵ .................. C01B 21/00; C01B 17/00
[52] U.S. Cl. .................. 423/235; 423/242.3; 423/242.7; 422/168
[58] Field of Search .......... 423/239, 239 A, 235, 423/235 D, 242.3, 242.7; 422/168

[56] References Cited

U.S. PATENT DOCUMENTS

| | | |
|---|---|---|
| 3,900,554 | 8/1975 | Lyon . |
| 4,131,432 | 12/1978 | Sato et al. . |
| 4,208,386 | 6/1980 | Arand et al. . |
| 4,325,924 | 4/1982 | Arand et al. . |
| 4,486,398 | 12/1984 | Casperson ............... 423/450 |
| 4,719,092 | 1/1988 | Bowers . |
| 4,751,065 | 6/1988 | Bowers . |
| 4,770,863 | 9/1988 | Epperly et al. . |
| 4,777,024 | 10/1988 | Epperly et al. . |
| 4,780,289 | 10/1988 | Epperly et al. . |
| 4,803,059 | 2/1989 | Sullivan et al. . |
| 4,830,839 | 5/1989 | Epperly et al. . |
| 4,842,834 | 6/1989 | Burton ..................... 423/235 |
| 4,863,704 | 9/1989 | Epperly et al. ............ 423/235 |
| 4,902,488 | 2/1990 | Epperly et al. ............ 423/235 |
| 4,915,036 | 4/1990 | DeVita ..................... 110/215 |
| 4,950,473 | 8/1990 | Flockenhaus et al. ...... 423/235 |
| 4,985,218 | 1/1991 | DeVita ..................... 423/235 |

FOREIGN PATENT DOCUMENTS

| | | |
|---|---|---|
| WO88/07024 | 3/1988 | World Int. Prop. O. . |
| WO88/07497 | 3/1988 | World Int. Prop. O. . |
| WO88/07974 | 4/1988 | World Int. Prop. O. . |
| WO89/02780 | 8/1988 | World Int. Prop. O. . |
| WO89/02781 | 8/1988 | World Int. Prop. O. . |
| WO89/02870 | 9/1988 | World Int. Prop. O. . |

Primary Examiner—Gary P. Straub
Attorney, Agent, or Firm—St. Onge Steward Johnston & Reens

[57] ABSTRACT

The removal of sulfur oxides ($SO_x$) and nitrogen oxides ($NO_x$) from combustion effluents is enhanced by the supplying of reactants in a particular distribution pattern in the gas flow. To achieve the particular distribution pattern and to avoid impingement of the reactant on the heat exchanger tubes of the combustor, an elongated injection lance comprising c cooling jacket and plural spaced injections ports is employed. The cooling jacket protects the reactant supply to the injection ports from the high temperatures of the combustion gases.

15 Claims, 5 Drawing Sheets

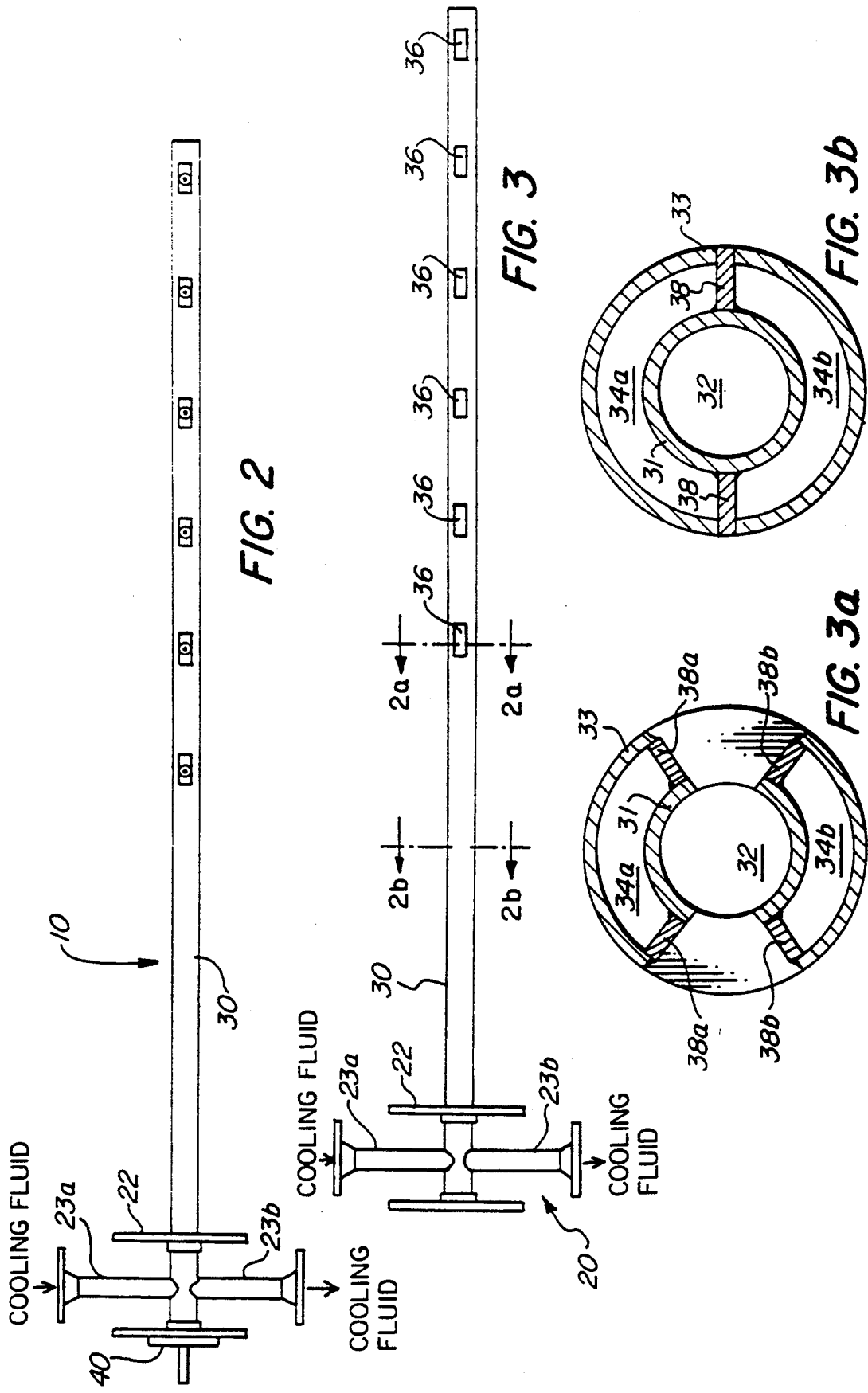

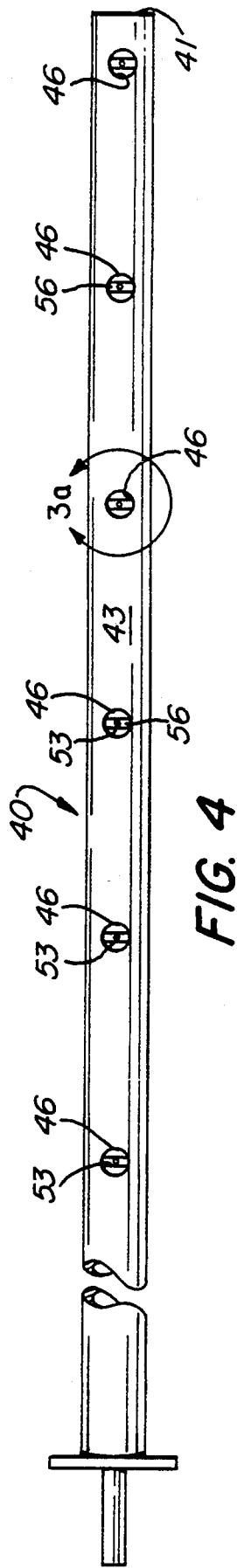
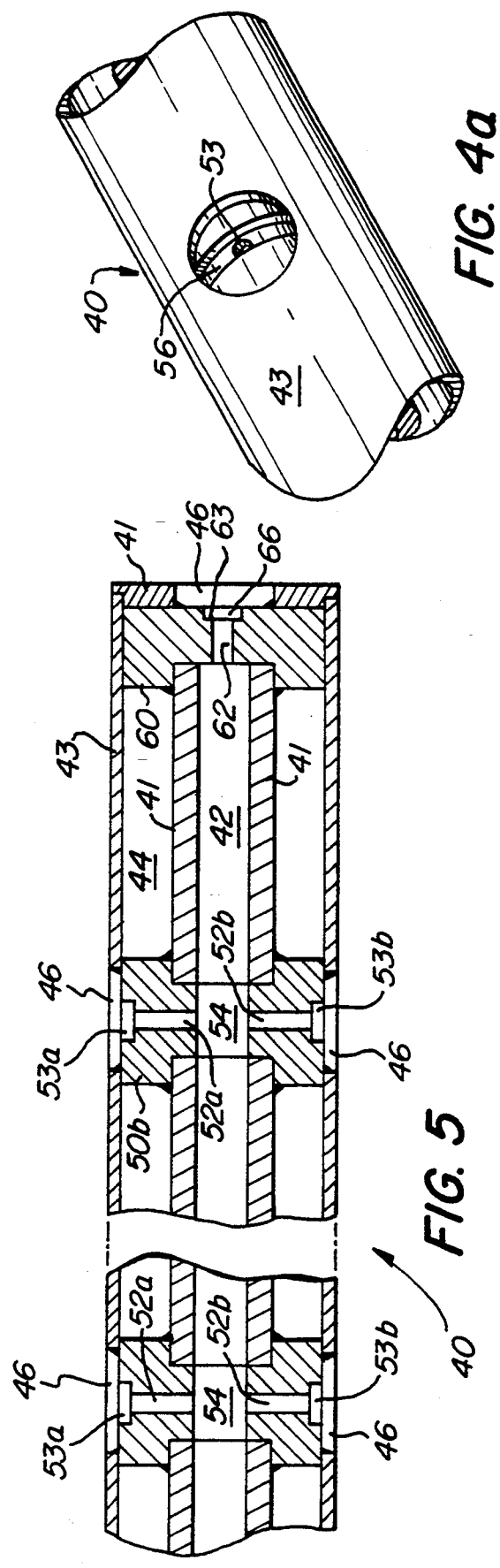
FIG. 4
FIG. 4a
FIG. 5

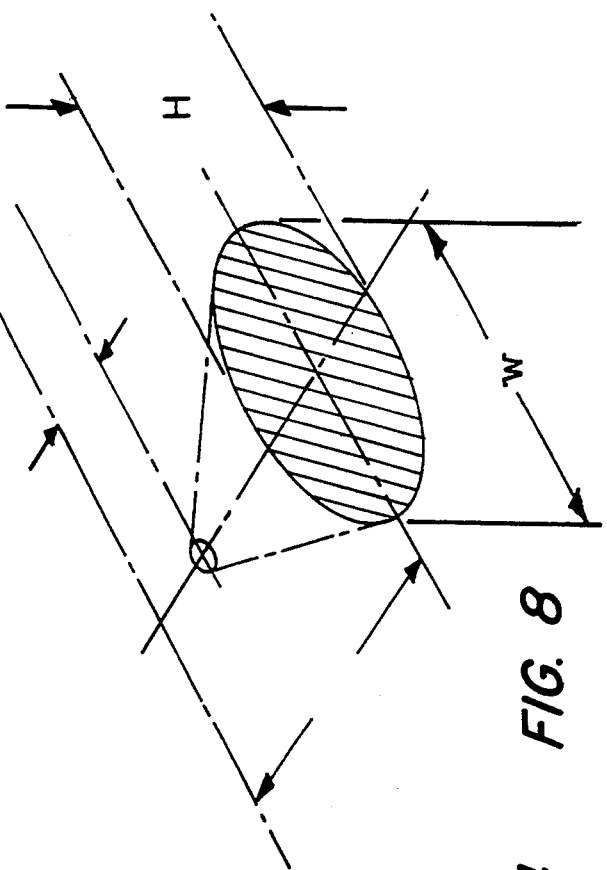
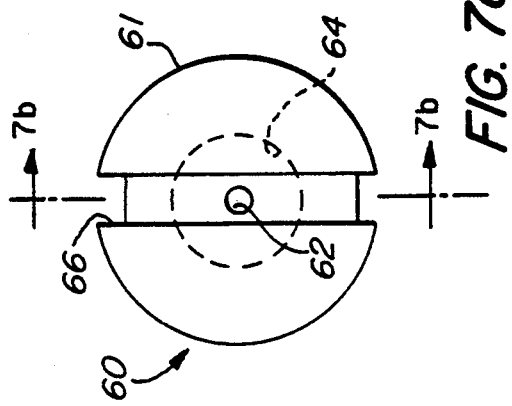
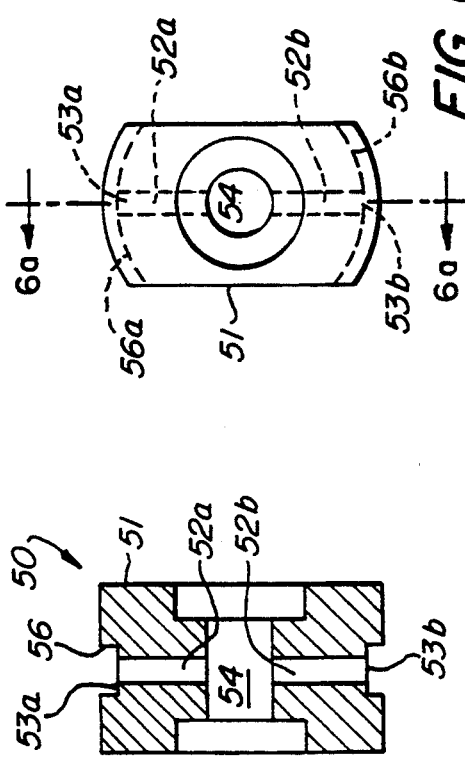
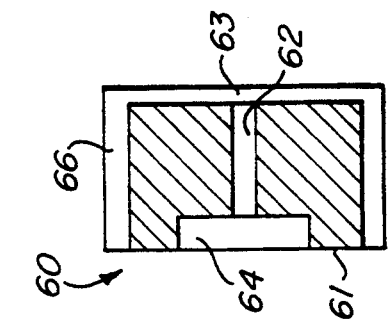

LANCE-TYPE INJECTION APPARATUS FOR INTRODUCING CHEMICAL AGENTS INTO FLUE GASES

TECHNICAL FIELD

The present invention relates to an apparatus which permits the introduction of a chemical agent into relatively confined areas of a utility boiler. Most preferably, the injected chemical agent is especially for the purpose of reducing the level of pollutants, such as nitrogen oxides ($NO_x$) or sulfur oxides ($SO_x$), in the effluent from the combustion of carbonaceous fuels and other organic matter. The apparatus comprises a lance-type injector, by which is meant an injector which extends to a significant extent into the interior of the boiler.

Carbonaceous fuels can be made to burn more completely, and with reduced emissions of carbon monoxide (CO) and unburned hydrocarbons, when the oxygen concentrations and air/fuel ratios employed are those which permit high flame temperatures. When fossil fuels are used in suspension fired boilers such as large utility boilers, temperatures above about 2000° F. and typically about 2200° F. to about 3000° F. are generated. Unfortunately, such high temperatures, as well as hot spots of higher temperatures, tend to cause the production of thermal $NO_x$, the temperatures being so high that free radicals of oxygen and nitrogen are formed and chemically combine as nitrogen oxides. $NO_x$ can also arise from oxidation of nitrogen containing compounds in the fuel. $NO_x$ can form even in circulating fluidized bed boilers which operate at temperatures which typically range from 1300° F. to 1700° F.

Nitrogen oxides are troublesome pollutants which are found in the combustion effluent streams of boilers when fired as described above, and comprise a major irritant in smog. It is further believed that nitrogen oxides contribute tropospheric ozone, a known threat to health, and can undergo a process known as photochemical smog formation, through a series of reactions in the presence of sunlight and hydrocarbons. Moreover, nitrogen oxides comprise a significant contributor to acid rain, and have been implicated as contributing to the undesirable warming of the atmosphere, commonly referred to as the "greenhouse effect".

Recently, many processes for reducing nitrogen oxides have been developed, which comprise the introduction into combustion effluents of chemical agents which reduce $NO_x$ by selective, free radical-mediated processes. Such processes are often referred to as selective non-catalytic reduction (SNCR) processes. SNCR processes are believed to be temperature sensitive and require the introduction of specific chemical agents into the boiler at specific temperature zones in order to be effective. Often, though, due to the geometry of the boiler, such temperature zones wherein desirable chemical agents should be introduced are in confined or otherwise inconvenient locations for introduction. For instance, in a typical utility boiler, there are areas between heat exchange tubes where desired temperature zones may exist. Such areas are generally less than 2 meters, often less than 1.5 meters, in the direction of effluent flow. Unfortunately, conventional injectors, which produce a spray pattern having a substantially conical shape, cause the chemical agent being sprayed into the effluent to impinge upon these heat exchange tubes. Because of the temperature differential between the effluent and the heat exchange tubes (and also the walls of the boiler), the chemical agent, when striking the relatively cool heat exchange tube or boiler walls, will not only be less effective at the reduction of $NO_x$, but can in certain circumstances react to form additional $NO_x$ or other pollutants such as ammonia ($NH_3$) or CO, depending on the chemical agent being utilized. In addition, impingement of liquid droplets on the tubes can result in rapid corrosion and failure of the tubes.

One method to avoid impingement is to use an injector that produces very small droplets which will evaporate rapidly. However, it is virtually impossible to achieve penetration of such small droplets in a direction perpendicular to the flow of the gas. The extent of penetration required can often be in the range of two to ten times the distance between tube banks. Larger droplets and higher droplet velocities will result in increased penetration but impingement on tube surfaces will almost certainly result from these conditions. An alternative method of achieving chemical distribution in such narrow spaces is to extend the injector into the effluent beyond the wall. However, the injector will become exposed to thermal stresses and differential thermal expansion between various parts of the injector.

BACKGROUND ART

As noted, the introduction of chemical agents into an effluent has in the past been accomplished by the use of injectors which produce a spray pattern effective for certain boiler applications. For instance, Burton, in U.S. Pat. No. 4,842,834, discloses a novel injector for introducing pollutant-reducing chemical agents into an effluent which produces a spray pattern uniquely effective at introducing chemical agents into a relatively unconfined space. If such an injector were utilized in the vicinity of heat exchange tubes, though, substantial impingement could possibly occur.

This is also the case with copending and commonly assigned U.S. Patent Application entitled "Process and Injector for Reducing the Concentration of Pollutants in an Effluent," having Ser. No. 07/160,684, filed in the name of DeVita on Feb. 26, 1988.

What is desired, therefore, is an apparatus which permits the introduction of chemical agents into relatively confined areas of a boiler in order to permit the distribution of chemical agents and reduction of pollutants in the effluent in that area without undesirable impingement on boiler walls or heat exchange tubes. Such an apparatus will preferably produce a relatively flat spray pattern consisting of small droplets with moderate droplet velocities.

DISCLOSURE OF INVENTION

The present invention comprises an injection apparatus for introducing chemical agents into the effluent from the combustion of a carbonaceous fuel. The apparatus comprises a lance which is adapted to at least partially extend into the effluent. The lance comprises a cooling jacket having an axial interior conduit and an axially circumferential exterior conduit therein. The axial interior conduit of the jacket is defined by an interior wall; and the circumferentially exterior conduit is defined by the space between the interior wall and an exterior wall of the jacket. The jacket also comprises at least one orifice through the interior wall and the exterior wall (and therefore through the exterior conduit) which provides access from the interior conduit to the effluent. The jacket is adapted to permit the flow of a cooling fluid through the exterior conduit.

The apparatus further comprises an injection shaft which is removably disposed within the interior conduit of the jacket. The shaft comprises a coaxial inner conduit defined by an inner tube and a coaxial outer conduit defined by the space between the inner tube and an outer wall of the shaft. The inner conduit is adapted to permit the flow of a chemical agent therethrough and the outer conduit adapted to permit the flow of an atomization fluid therethrough. The shaft also comprises at least one port through the outer wall which corresponds in location to the at least one orifice of the jacket.

According to the invention, at least one injector is disposed within the shaft, which functions such that chemical agents flowing through the inner conduit of the shaft are injected through the port of the shaft and the orifice of the jacket by the injector. The at least one injector is adapted so that atomization fluid flowing through the outer conduit of the shaft is forced by the at least one injector to impinge on the chemical agents being injected.

BRIEF DESCRIPTION OF THE DRAWINGS

The present invention will be better understood and its advantages more apparent in view of the following detailed description, especially when read with reference to the appended drawings, wherein:

FIG. 2 is a side view of the apparatus of the present invention installed in the wall of a boiler;

FIG. 3 is side view of the lance of the present invention;

FIG. 3a is a cross section view of the lance of FIG. 2 taken along lines 3a—3a;

FIG. 3b is a cross section view of the lance of FIG. 2 taken along lines 3b—3b;

FIG. 4 is a side view of the shaft of the present invention;

FIG. 4a is an enlarged side view taken in perspective of a portion of shaft of FIG. 4 taken along line 4a;

FIG. 5 is a partial top view in cross section of the shaft of FIG. 4, having injectors disposed therein;

FIG. 6a is a side view in cross section of an injector of the present invention;

FIG. 6b is a front view of an injector of the present invention, showing two passages and two bifrustohemitoroidal grooves in phantom;

FIG. 7a is a side view in cross section of an end-cap injector of the present invention;

FIG. 7b is a front view of the injector of FIG. 6a showing the axial channel in phantom; and FIG. 8 is a representation of the spray pattern produced by the apparatus of the present invention.

DESCRIPTION OF THE PREFERRED EMBODIMENT

Figure 1:
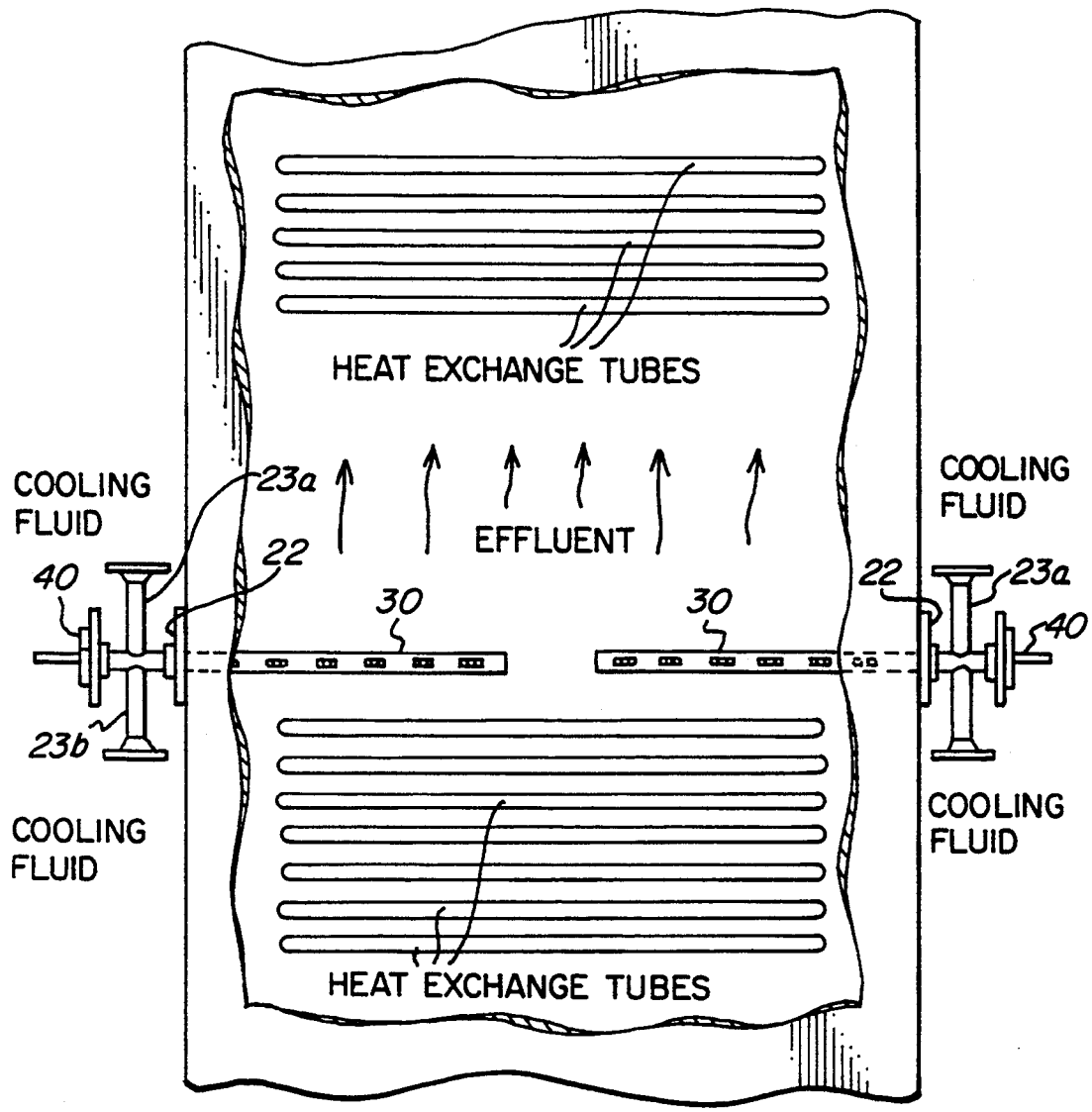
FIG. 1 is an installation schematic, partially broken away, of the apparatus of the present invention disposed in a utility boiler.

The present invention relates to a lance-type injection apparatus 10 for introducing chemical agents into the effluent from the combustion of a carbonaceous fuel within confined spaces in a boiler. As used herein, the terms "top" "bottom" "right" "left" "up", "down" etc. are used with respect to apparatus 10 when in the orientation illustrated in FIG. 1. It will be recognized, though, that apparatus 10 may assume various orientations when in actual use.

Apparatus 10 of the present invention, as illustrated in FIG. 3, generally comprises a lance 20 which extends into the effluent and is itself comprised of a cooling jacket 30. Jacket 30 comprises an axial interior conduit 32, illustrated in FIGS. 3a and 3b and defined by interior wall 31, and an axially circumferential exterior conduit 34, defined as the space between interior wall 31 and an exterior wall 33. Exterior conduit 34 is coaxial with and disposed about interior conduit 32. Jacket 30 also comprises at least one orifice 36 through interior wall 31 and exterior wall 33 which provides access from interior conduit 32 to the effluent, as illustrated in FIGS. 3 and 3a.

Exterior conduit 34 is adapted to permit the flow of a cooling fluid therethrough in order to maintain interior conduit 32 at or below a desired temperature. In order to achieve this, it is desired that exterior conduit 34 be fabricated so as to comprise two complementary hemiconduits which, for convenience, can be referred to as an upper exterior conduit 34a and a lower exterior conduit 34b, as illustrated in FIGS. 3a and 3b. This can be accomplished by fabricating jacket 30 so as to have a dividing wall 38 running the length of jacket 30 on either side of interior conduit 32 and connecting exterior wall 33 to interior wall 31, as illustrated in FIG. 3b. Of course it will be recognized that dividing wall 38 splits into two walls 38a and 38b at orifices 36, as illustrated in FIG. 3a. The cooling fluid can be introduced through either one of exterior conduits 34a or 34b to flow the length of jacket 30 and then return through the other of exterior conduits 34a or 34b. For instance, cooling fluid can be introduced to upper exterior conduit 34a through duct 23a, and return through lower exterior conduit 35b with an outlet through duct 23b. Ducts 23a and 23b of lance 20 are disposed outside of the wall of the boiler, with flange 22 being utilized to attach lance 20 to the boiler wall.

Suitable cooling fluids include water, steam or any other fluid effective at flowing through a conduit and also effective at maintaining the temperature of interior conduit 32 below a certain level. Desirably, the temperature of interior conduit 32 is maintained below the boiling point of chemical agents flowing through an injection shaft disposed within interior conduit 32, as discussed in more detail below. Preferably, the temperature of interior conduit 32 will be maintained at no greater than about 200° F.

Figure 1A:
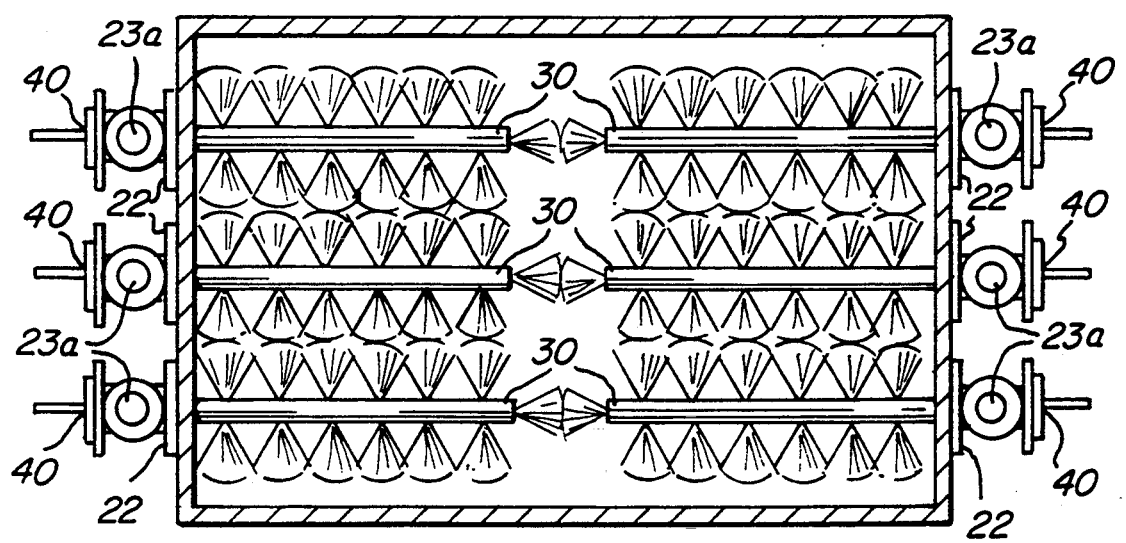
FIG. 1a is a horizontal cross section view of the utility boiler of FIG. 1, having the apparatus of the present invention, and illustrating the spray patterns achieved.

Lance 20 can be formed of any material suitable for maintaining its structural and dimensional integrity under the conditions to which it would be exposed within the effluent, for instance, effluent temperatures up to and exceeding about 2000° F. Suitable materials include steel and iron and various alloys thereof. The length of lance 20 can vary depending upon the conditions under which it will be used. For example, as illustrated in FIG. 1 and 1a, if apparatus 10 is being used in a boiler such that pairs of apparatus 10 are extending from either side of the boiler towards each other, it would only be necessary for apparatus 10 and, hence, lance 20, to extend less than half way into the boiler. In a boiler having a width of about 5.0 to about 6.0 meters, therefore, it is only necessary that lance 20 be between about 2.0 and 2.5 meters in length. Under other conditions, such as where apparatus 10 were expected to provide chemical agents through the entire width of the boiler, lance 20 would have to be longer, i.e., such as about 5.0 meters in length.

Apparatus 10 of the present invention also comprises an injection shaft 40, as illustrated in FIG. 4. Shaft 40 is removably disposed within interior conduit 32 of jacket 30 and comprises an inner conduit 42 and an outer conduit 44 which are coaxial with each other, with outer conduit 44 disposed about inner conduit 42, as illustrated in FIG. 5. Inner conduit 42 is defined by an inner tube 41 of shaft 40 whereas outer conduit 44 is defined as the gap between inner tube 41 and an outer wall 43 of shaft 40.

Inner conduit 42 is adapted to permit the flow of a fluid chemical agent for the reduction of pollutants in an effluent therethrough. Generally, inner tube 41, which defines inner conduit 42, can be comprised of any material suitable for maintaining thermal and dimensional stability under the temperatures and pressures to which it will be exposed. For instance, assuming that jacket 30 is operating effectively and that the flow of cooling fluid through jacket 30 is effective to maintain the temperature of interior conduit 32 of jacket 30 at below 200° F., the material that makes up inner tube 41 need only exhibit thermal and dimensional stability at 200° F. In order to protect against the possibility of failure of jacket 30, it is desired that inner tube 41 exhibit stability up to much higher temperatures, i.e. up to and above 2000° F., the approximate temperature of the effluent to which it is expected apparatus 10 will be exposed. Moreover, the chemical agents flowing through inner conduit 42 have a certain pressure as does atomization fluid flowing through outer conduit 44, as will be explained in more detail below. The material which makes up inner tube 41, therefore, should exhibit sufficient stability to those pressures. Among those materials which are suitable for inner tube 41 are rigid plastics such as high density polyethylene, rubber and metals such as steel and iron. Preferably, in order to protect inner tube 41 against the possibility of failure of jacket 30, inner tube 41 is made up of a metal such as steel or iron.

As will be noted with respect to FIG. 4, inner tube 41 is most preferably comprised of a series of tubular structures which are rendered continuous by the agency of injectors disposed within shaft 40, as will be explained in more detail below.

Although this disclosure is written in terms of the reduction of nitrogen oxides in an effluent by the use of apparatus 10, such is for illustrative purposes only. It will be recognized that this invention is equally effective when utilized for the reduction of any pollutant in a combustion effluent which can be reduced by the introduction of fluid chemical agents. Indeed, apparatus 10 can be effectively utilized for the introduction into an effluent of fluid chemical agents for any purpose.

Where the pollutant which is being reduced by the use of apparatus 10 is $NO_x$, the chemical agents being introduced are often solutions of nitrogenous compositions including ammonia such as disclosed by Lyon in U.S. Pat. No. 3,900,554 and urea such as disclosed by Arand et al. in either of U.S. Pat. Nos. 4,208,386 and 4,325,924, the disclosures of each of which are incorporated herein by reference. Additional appropriate chemical agents effective for the reduction of nitrogen oxides include those disclosed by International Patent Application entitled "Reduction of Nitrogen- and Carbon-based Pollutants Through the Use of Urea Solutions," having publication number WO 87/02025, filed in the name of Bowers on Oct. 3, 1986; U.S. Pat. No. 4,751,065 in the name of Bowers; U.S. Pat. No. 4,719,092, also to Bowers; International Patent Application entitled "Process for the Reduction of Nitrogen Oxides in an Effluent Using a Heterocyclic Hydrocarbon," having publication number WO 88/07497, filed in the names of Epperly and Sullivan on Mar. 11, 1988; International Patent Application entitled "*Process for the Reduction of Nitrogen Oxides in an Effluent Using Sugar,*" having publication number WO 88/07024, filed in the names of Epperly and Sullivan on Mar. 13, 1988; U.S. Pat. No. 4,803,059 to Sullivan and Epperly; International Patent Application entitled "*Process for the Reduction of Nitrogen Oxides in an Effluent,*" having publication number WO 89/02870, filed in the names of Epperly, Sullivan and Sprague on Sep. 22, 1988; International Patent Application entitled "*Process for the Reduction of Nitrogen Oxides in an Effluent,*" having publication number WO 88/07974, filed in the names of Epperly, Sullivan and Sprague on Oct. 14, 1988; U.S. Pat. No. 4,770,863 to Epperly and Sullivan; copending and commonly assigned U.S. Patent Applicaiton entitled "Process for Nitrogen Oxides Reduction with Minimization of the Production of Other Pollutants," having Ser. No. 07/207,382, filed in the names of Epperly, O'Leary, Sullivan and Sprague on Jun. 15, 1988; copending and commonly assigned U.S. Patent Application entitled "*Multi-stage Process for Reducing the Concentration of Pollutants in an Effluent Using an Ammonium Salt,*" having Ser. No. 07/207,292, filed in the names of Epperly, Peter-Hoblyn, Shulof, Jr., Sullivan and Sprague on Jun. 15, 1988; and U.S. Pat. No. 4,830,839 to Epperly, Peter-Hoblyn and Sullivan, the disclosures of which are incorporated herein by reference.

These patents and patent applications contemplate the use of chemical agents which comprise solutions of urea or ammonia introduced at effluent temperatures which can be from about 1600° F. to about 2100° F., more preferably about 1700° F. to about 2100° F. Optionally, the urea or ammonia solutions can be enhanced by other compositions such as hexamethylenetetramine (HMTA), oxygenated hydrocarbons such as ethylene glycol, ammonium salts of organic acids having a carbon-to-nitrogen ratio of greater than 1:1, such as ammonium acetate and ammonium benzoate, heterocyclic hydrocarbons having at least one cyclic oxygen such as furfural, sugar, molasses, 5- or 6-membered heterocyclic hydrocarbons having at least one cyclic nitrogen such as pyridine and pyrolidine, hydroxy amino hydrocarbons such as milk or skimmed milk, amino acids, proteins and monoethanolamine and various other compounds which are disclosed as being effective at the reduction of nitrogen oxides in an effluent. When enhanced, the chemical agents can be introduced at effluent temperatures of about 1200° F. to about 1750° F., more preferably about 1350° F. to about 1750° F.

These chemical agents can be introduced through apparatus 10 according to processes which maximize the $NO_x$ reductions achieved while minimizing the production of other pollutants. Such processes are described in, foe instance, U.S. Pat. No. 4,777,024 to Epperly, Peter-Hoblyn, Shulof, Jr. and Sullivan, and U.S. Patent No. 4,780,289 to Epperly, O'Leary and Sullivan as well as International Patent Application entitled "*Multi- stage Process for Reducing the Concentration of Pollutants in an Effluent,*" having publication number WO 89/02780, filed in the names of Epperly, Peter- Hoblyn, Shulof, Jr. and Sullivan on Aug. 12, 1988; and International Patent Application entitled "*Process for Nitrogen Oxides Reduction and Minimization of the Production of Other . Pollutants,*" having publication number WO 89/02781 filed , in the names of Epperly, Sullivan, Sprague and O'Leary on Aug. 12, 1988, the disclosures of each of which are incorporated herein by reference.

As noted, outer conduit 44 is adapted to permit the flow of an atomization fluid therethrough. Suitable atomization fluids can be any fluid effective at causing the atomization of the chemical agent when contacted by the atomization fluid. Typically, the atomization fluid comprises air, steam or water, although water is less desired except where the cooling and/or diluting effects water has on the chemical agent may be beneficial.

Shaft 40 further comprises at least one port 46 in its outer wall 43. When shaft 40 is disposed within lance 20, as noted above and illustrated in FIG. 1, each port 46 should correspond in location to an orifice 36. In addition, the number of ports 46 should correspond in number to the number of orifices 36.

Apparatus 10 also comprises at least one injector 50 which is disposed within shaft 40 such that chemical agents flowing through inner conduit 42 are injected by injector 50 through port 46 of shaft 40. Furthermore, due to the register between each port 46 and each orifice 36, chemical agents are also injected through orifice 36 of jacket 30, and thereby into the effluent. Injector 50 is formed such that atomization fluid which is flowing through outer conduit 44 of shaft 40 is forced by injector 50 to impinge on the chemical agents being injected. The spray pattern of the chemical agents produced is sufficient to achieve uniform and relatively complete distribution of chemical agent in the effluent. Most preferably, the spray pattern of the chemical agents is a relatively flat fan. By relatively flat fan, as illustrated with respect to FIG. 8, is meant that the height (H) of the spray pattern is no greater than about two-thirds of the width (W) of the spray pattern. More preferably, the height of the spray pattern should be no greater than about one-half of the width of the spray pattern.

Although injector 50 can be any injector suitable for injecting chemical agents from shaft 40 into the effluent, advantageously injector 50 comprises a bifrustocylindrical element 51 having a channel 54 extending axially therethrough, as illustrated in FIGS. 5, 6a and 6b. The term "bifrustocylindrical" as used herein is meant to indicate a cylindrical element truncated by a pair of planes parallel to each other and the axis of the cylinder and spaced equally on either side of that axis. As illustrated in FIG. 4, when injector 50 is disposed within shaft 40, channel 54 extending therethrough is contiguous with and, in fact, forms a part of inner conduit 42 in order to permit flow of the chemical agent therethrough. Injector 50 further comprises at least one injection passage 52 which extends orthogonally (i.e. at a right angle) from channel 54 and which has a terminus 53 (i.e. a terminating end) at an arcuate surface of element 51. In other words, and as illustrated in FIGS. 5, 6a and 6b, passage 52 extends from channel 54 and terminates at a surface of element 51 not formed by the truncating planes, as described above. Since, as will be observed from FIGS. 5 and 6a, passage 52 is in operative connection with channel 54, chemical agents flowing through channel 54 will also flow through passage 52 and be injected out terminus 53.

Injector 50 also comprises a groove 56, preferably a bifrustohemitoroidal groove 56 which extends partially circumferentially about element 51 such that terminus 53 of passage 52 lies within groove 56. The location of groove 56 can be more easily observed by reference to FIG. 6b, which comprises two bifrustohemitoroidal grooves 56a and 56b, as the most preferred embodiment, which together form a bifrustotoroidal groove extending about the arcuate surfaces of element 51. The term "bifrustotoroidal" as used herein is meant to indicate a toroid extending circumferentially about element 51 and which is truncated by the same planes which truncate the cylinder to form element 51. Taking one of the two elements of a bifrustotoroid results in a bifrustohemitoroid.

Most preferably each injector 50 disposed within shaft 40 comprises two orthogonal passages 52a and 52b each of which extend orthogonally from channel 54 of injector 50 in opposite directions. In this way each injector 50 injects chemical agents on either side. Such an injector 50 having two passages 52a and 52b will also have two bifrustohemitoroidal grooves 56a and 56b. The terminus 53a and 53b of each of passages 52a and 52b lies within, respectively, one of said grooves 56a and 56b, as illustrated in FIGS. 6a and 6b. Such an injector 50 having two passages 52a and 52b will be considered to be one injector 50 but having two injector equivalents, since each produces two injector spray patterns.

It will be recognized that if apparatus 10 is disposed such that jacket 30 extends parallel to and at or near a wall of the boiler, the spray of chemical agents is desired only in one direction, i.e., away from that wall, and only one injector equivalent for each injector 50 is used. If, as is the case in the preferred embodiment, apparatus 10 is positioned inside the boiler away from a wall, then for complete coverage of chemical agents it is desired that apparatus 10 be effective at spraying chemical agents in either direction, as illustrated in FIG. 1a. By the use of an injector 50 having two injector equivalents as described above, this is possible. To do so, though, shaft 40 and jacket 30 must each have a plurality of ports 46 and orifices 36. Such plurality of ports 46 and orifices 36 are respectively grouped in pairs at opposite sides of apparatus 10 such that injector 50 is disposed within shaft 40 such that the terminus 53a and 53b of passages 52a and 52b will correspond with and be in register with each port 46 and orifice 36 so as to be able to inject chemical agents into the effluent.

As illustrated in FIG. 4a, when injector 50 is disposed within shaft 40, it is preferably positioned such that the terminus 53 of passage 52 is approximately centered within the corresponding port 46 of shaft 40. In this way, as illustrated in both FIGS. 4a and FIG. 5, the arcuate surface of bifrustocylindrical element 51 sits up against the inner part of outer wall 43 of shaft 40, thereby preventing atomization fluid which is flowing through outer conduit 44 of shaft 40 from flowing through port 46, except at the location where groove 56 is located. In this way, groove 56 channels the atomization fluid through the gap between outer wall 43 and element 51 formed by groove 56, such that it impinges on the stream of chemical agents being injected from terminus 53 of passage 52. Most preferably, atomization fluid impinges on the stream of chemical agents from both sides, thereby forming the fan shaped spray pattern desired. Advantageously, element 51 is attached to outer wall 43 by welding, to insure the integrity of the contact.

It is desired that there be a plurality of injectors 50a, 50b, etc. present in each shaft 40. Most preferably at least 5 injectors 50 are present, corresponding to 10 injector equivalents, with 10 corresponding ports 46 and orifices 36 to permit a uniform distribution of chemical agent throughout the effluent. Preferably, with respect to each injector 50, the further it is disposed outward from the wall of the boilers, the larger is the diameter of passage 52, to compensate for reduction of pressure of the flow of the chemical agent. Moreover, the diameter of passage 52 for some of injectors 50 can be varied for other purposes.

It is also desired to have an end-cap injector 60 disposed at the terminal end 41 of shaft 40 such that chemical agent is also injected straight out of apparatus 10 (directly to the right as illustrated in FIGS. 1a, 4 and 5). A suitable end-cap injector 60 is illustrated in FIGS. 7a and 7b and comprises a cylindrical element 61 having an axial channel 64 extending partially therein which corresponds to inner conduit 42. Channel 64 then narrows to an injection passage 62. End-cap injector 60 also comprises a bisecting groove 66 extending about injector 60 wherein the terminus 63 of passage 62 lies within groove 66. Since groove 66 is in operative connection with outer conduit 44, atomization fluid impinges on the stream of chemical agents injected out of passage 62 in the same manner as described above. Of course, shaft 40 and jacket 30 must also comprise, respectively, a port 46 and an orifice 36 at the terminal ends thereof for injection by end-cap injector 60 to occur.

Apparatus 10 of the present invention is especially advantageous as noted above when injection is desired in confined spaces where it is necessary to distribute the chemical agents evenly and within one plane, where the trajectory of conventional wall injectors are not suitable. Moreover, by providing apparatus 10 with separable and independent elements, i.e., lance 20 and removable shaft 40, several advantages are gained. For instance, differential expansion is less of a problem where the lances are formed as separate units. Further, shaft 40 can be removed to replace injectors 50 or end-cap injector 60 or for any other reason without shutting down or otherwise effecting the operation of the boiler since lance 20 remains inside the boiler. It is also possible to provide for thermal isolation between lance 20 and shaft 40 by spacing shaft 40 away from lance 20 and having gland air (low pressure air) in this gap in interior conduit 32. This allows for differential expansion and also protects the nozzle from entrainment air. Furthermore, having separate elements reduces the possibility of breakdown which might cause mixing of chemical agents with cooling fluids.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

We claim:

1. A process for reducing pollutants comprising nitrogen oxides or sulfur oxides in a combustion effluent, the process comprising:

(a) providing an apparatus which comprises:

(i) a lance at least partially extending into the effluent, said lance comprising a cooling jacket having an interior wall which defines an axial interior conduit and an axially circumferential exterior conduit defined as the space between said interior wall and an exterior wall of said jacket, and at least one orifice through said interior wall and said exterior wall;

(ii) an injection shaft disposed within said interior conduit of said jacket, said shaft comprising coaxial inner and outer conduits, said inner conduit defined by an inner tube of said shaft and said outer conduit defined as the space between said inner tube and an outer wall of said shaft, said shaft further comprising at least one port through said outer wall corresponding in location to and in register with said at least one orifice of said jacket; and (iii) at least one injector disposed within said shaft such that chemical agents flowing through said inner conduit are injected through said port of said shaft and said orifice of said jacket, wherein said at least injector is adapted such that atomization fluid flowing through said outer conduit of said shaft is forced by said at least one injector to impinge on the chemical agents being injected;

(b) introducing a cooling fluid through said exterior conduit of said jacket;

(c) introducing an atomization fluid through said outer conduit of said shaft; and (d) introducing a nitrogen oxides- or sulfur oxides-reducing chemical agent which comprises ammonia, urea, hexamethylenetetramine, oxygenated hydrocarbons, ammonium salts of organic acids having a carbon-to-nitrogen ratio of greater than 1:1, heterocyclic hydrocarbons having at least one cyclic oxygen, sugar, molasses, 5- or 6-membered heterocyclic hydrocarbons having at least one cyclic nitrogen, hydroxy amino hydrocarbons, amino acids, proteins or monoethanolamine through said inner conduit of said shaft so as to be injected by said injector into said effluent, which is at a temperature of about 1200° F. to about 2100° F.

2. The process of claim 1, wherein said at least one injector comprises a bifrustocylindrical element having a channel extending axially therethrough which is contiguous with said inner conduit of said shaft, and at least one injection passage extending orthogonally from said channel and having a terminus at an arcuate surface of said element, wherein said at least one injector further comprises at least one bifrustohemitoroidal groove extending about an arcuate surface of said element such that the terminus of said passage lies within said groove, said groove being in operative contact with said outer conduit of said shaft.

3. The process of claim 2, wherein said injector comprises a pair of passages extending orthogonally from said channel and each having a terminus in complementary arcuate surfaces of said element, and wherein said injector comprises a bifrustotoroidal groove extending circumferentially about said element such that the terminus of each of said passages lies within portions of said groove.

4. The process of claim 2 which further comprises an end-cap injector disposed at the terminal end of said shaft, said end-cap injector comprising a cylindrical element having an axial channel extending partially therein, and an injection passage extending from said channel the balance of the axial length of said element, wherein said element further comprises a bisecting groove extending thereabout such that the terminus of said passage lies within said groove.

5. The process of claim 1 wherein said exterior jacket is mounted on the wall of a utility boiler such that said jacket extends into a relatively confined interior area of the boiler.

6. The process of claim 1 wherein said shaft has the same number of ports as said jacket has orifices.

7. The process of claim 6 wherein said shaft has disposed therein injectors which total the same number of injector equivalents as said shaft has ports.

8. The process of claim 1 wherein the spray pattern formed by the action of the atomization fluid flowing along said grooves on the chemical agent exiting said passages is a relatively flat fan.

9. The process of claim 8 wherein the spray pattern has a height no greater than about two-thirds of its width.

10. The process of claim 9 wherein the spray pattern has a height no greater than about one-half of its width.

11. The process of claim 1 wherein said pollutant-reducing chemical agent comprises urea or ammonia.

12. The process of claim 11 wherein said pollutant-reducing chemical agent further comprises hexamethylenetetramine, oxygenated hydrocarbon, ammonium salts of organic acids having a carbon-to-nitrogen ratio of greater than 1:1, heterocyclic hydrocarbons having at least one cyclic oxygen, sugar, molasses, 5- or 6-membered heterocyclic hydrocarbons having at least one ayclic nitrogen, hydroxy amino hydrocarbons and mixtures thereof.

13. The process of claim 12 wherein the chemical agents are introduced at an effluent temperature of about 1200° F. to about 1750° F.

14. The process of claim 11 wherein the chemical agents are introduced at an effluent temperature of about 1600° F. to about 2100° F.

15. The process of claim 1, wherein said injection shaft is removably disposed within said interior conduit of said jacket.

* * * * *

UNITED STATES PATENT AND TRADEMARK OFFICE
CERTIFICATE OF CORRECTION

PATENT NO. : 5,342,592
DATED : August 30, 1994
INVENTOR(S) : Jeremy D. Peter-Hoblyn and Francois X. Grimard It is certified that error appears in the above-indentified patent and that said Letters Patent is hereby corrected as shown below:

column 2, line 5, "NO$_x$or" should read --NO$_x$ or--.

column 5, line 64, delete "." immediately before "herein".

column 6, line 62, "foe instance" should read --for instance--.

column 7, line 4, delete "." immediately after "Production of Other".

Signed and Sealed this

Thirty-first Day of January, 1995

Attest:

BRUCE LEHMAN

*Attesting Officer*   *Commissioner of Patents and Trademarks*